United States Patent [19]

Lowe et al.

[11] 4,354,205

[45] Oct. 12, 1982

[54] ATTACHABLE, IMAGE-MODIFYING SCREEN FOR TELEVISION IMAGES

[76] Inventors: George F. Lowe, 3435 Army St.; Peter A. Gutkin, 170 Capp St., both of San Francisco, Calif. 94110; Charles C. Wehrenberg, 72 Kissling, San Francisco, Calif. 94103

[21] Appl. No.: 194,235

[22] Filed: Oct. 6, 1980

[51] Int. Cl.[3] .................... H04N 5/72

[52] U.S. Cl. .................... 358/250; 358/253

[58] Field of Search .................... 358/250, 252, 254, 251, 358/253; 350/318; 40/156

[56] References Cited

U.S. PATENT DOCUMENTS

| | | | |
|---|---|---|---|
| 3,031,526 | 4/1962 | Oberstein | 358/252 |
| 3,215,776 | 11/1965 | Hamilton | 358/252 |
| 3,800,085 | 3/1974 | Ambats et al. | 358/250 |
| 4,246,613 | 1/1981 | Choder et al. | 358/253 |

FOREIGN PATENT DOCUMENTS

| | | | |
|---|---|---|---|
| 276856 | 9/1927 | United Kingdom | 40/156 |

*Primary Examiner*—Joseph A. Orsino, Jr.

[57] ABSTRACT

A non-alphanumeric, video image modifying device for television pictures which is easily attachable to a wide variety of typical televisions. Said modification of the picture image consists of real time reduction of picture data into abstract motion and color. Said device maximizes diffused light transmitted through its translucent screen by reflecting light emitted from the cathode ray tube off of the highly reflective surface of a lattice located between the cathode ray tube and said translucent screen.

6 Claims, 3 Drawing Figures

ATTACHABLE, IMAGE-MODIFYING SCREEN FOR TELEVISION IMAGES

SUMMARY

This invention consists of an opaque, flexible collar; a hook and loop fastener; a translucent, diffusing screen; an opaque lattice; and a housing which assemble into an image modifying device which easily attaches to typical televisions. These parts interlock with the interference between the lattice and the housing holding the flexible collar and the translucent screen in place. The hook-fastener is attached to the device such that the device can be hung in front of the television screen from a loop-fastener attached to the top of the television. The design of the screen and the housing approximate the shape of a typical television; the design of the flexible collar allows the device to fit different sizes of televisions by conforming to their sizes and shapes; the lattice divides the area of the television screen into approximately 100 regions; said lattice being approximately half as deep as the average of said region's width and height. The translucent screen and the lattice diffuse the light from the television screen which averages the chrominance and luminance emitted within each region defined by the lattice.

DRAWINGS

I. Front view

II. Side view

III. Exploded view from rear angle

DETAILED DESCRIPTION

Figure 1:
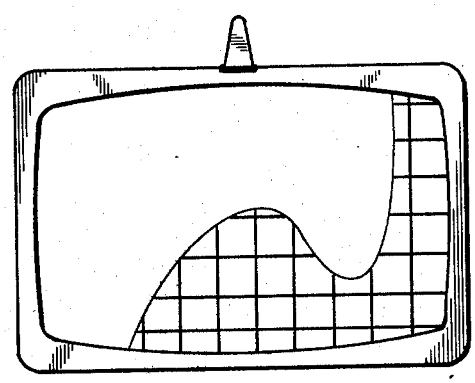
Figure 2:
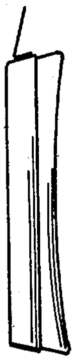
Figure 3:
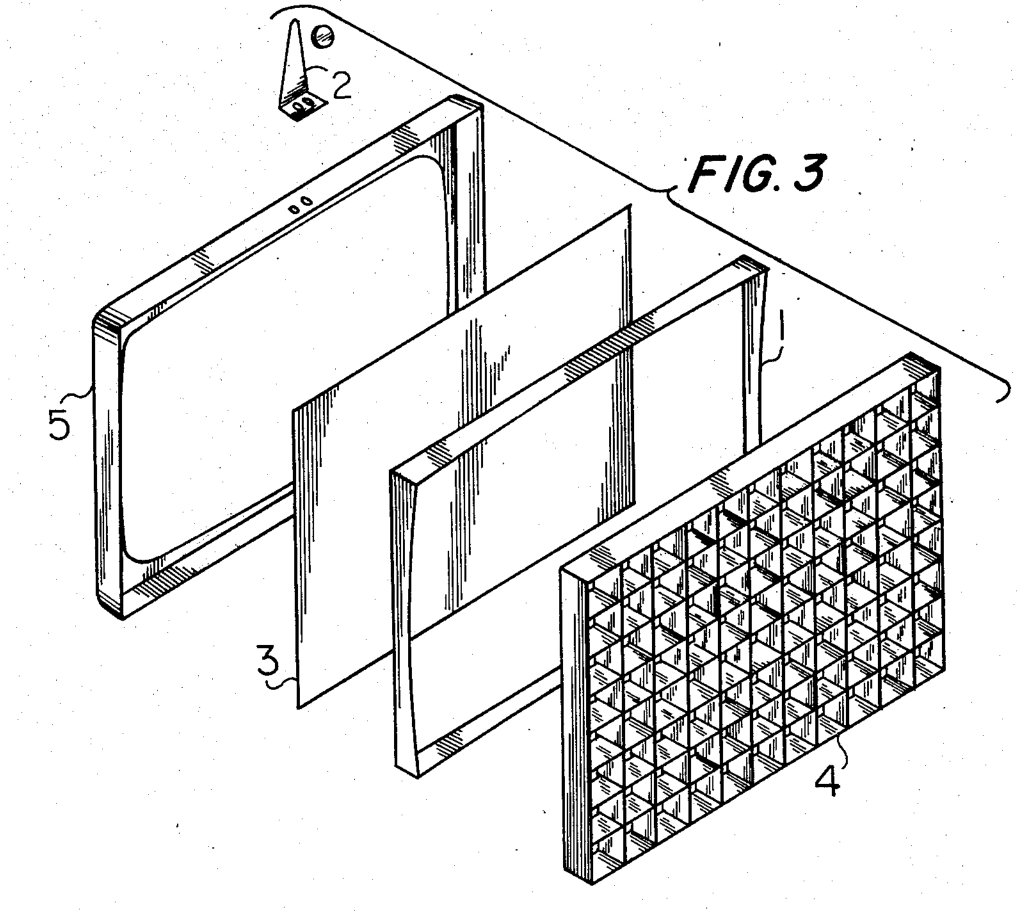

PARTS (1) FLEXIBLE COLLAR: a flexible strip (such as a low density flexible polymer foam) approximately $2'' \times \frac{1}{4}''$ which is long enough to surround the lattice. This collar is cut or cast such that when it is on the device it exhibits a curvature which allows the flat device to physically conform to the front of different televisions.

(2) HOOK AND LOOP FASTENER: a two part (such as velcro) system consisting of a tongue shaped part and a dot shaped part with glue on its back. Said tongue shaped piece attaches to the device. Said dot shaped part glues to the top or front of the television. This system allows the device to be quickly taken on and off of the television.

(3) DIFFUSING SCREEN: a sheet of flexible, translucent material (such as fiberglass or paper) approximately the size of a television screen.

(4) LATTICE: any lattice structure which divides the area into regions and whose depth is approximately the average of the height an width of each region. The lattice is designed to interlock with the HOUSING. The lattice has small teeth surrounding its outer perimeter which penetrate into and hold onto the flexible collar when the LATTICE is interlocked with the HOUSING.

(5) HOUSING: a rim designed to surround the device and hold it together by interlocking with the LATTICE. The front of the HOUSING approximates the appearance of an ordinary television. The OUTER RIM wraps around the sides of said LATTICE creating an interlock with said LATTICE which sandwiches said DIFFUSING SCREEN and said FLEXIBLE COLLAR between said LATTICE and said HOUSING.

We claim:

1. A real-time video image modifying device said modification being the hundredfold reduction of video resolution relative to the source television and said device comprising: a molded plastic housing said housing having an open forward end and an open back end; a flexible hanger strap attached to the top of said housing and arranged to allow said device to be hung in front of the screen of a television; a flat translucent but not transparent screen mounted in said housing and arranged to diffuse light through said forward end opening; a deep lattice formed from slats having highly reflective surfaces, said slats being spaced apart a distance greater then several pixels, said lattice being mounted behind said translucent screen inside of said housing and interlocked with said housing; a flexible collar surrounding the periphery of said lattice and said collar held between said lattice and said housing when said lattice is glued into said housing.

2. The device of claim 1 wherein the collar consists of a low density flexible foam, such as urethane, which has several inches of flexibility.

3. The device of claim 1 wherein said lattice has less than 100 openings which are squares $\frac{3}{4}$ inches to 2 inches on each side and are at least $\frac{5}{8}$ inches in depth and the walls of said lattice being less than 3/16 inch in thickness.

4. The device of claim 1 wherein the grid lines of said lattice are oriented vertically and horizontally.

5. The device of claim 1 wherein said flexible hanger strap consists of a multipoint fastener, such as Velcro, which can adhere to a glue-on dot of the fastener's mating material said dot being attached to the top or upper front of the television housing.

6. The device of claim 1 wherein said translucent screen is a sheet of plastic, such as fiberglass, or paper, such as vellum.

* * * * *